(12) United States Patent
Thayer et al.

(10) Patent No.: US 12,388,146 B2
(45) Date of Patent: Aug. 12, 2025

(54) MULTI-FUNCTIONAL COMPONENT FOR BATTERY PACKS

(71) Applicant: Rivian IP Holdings, LLC, Irvine, CA (US)

(72) Inventors: Brandon Thayer, Mission Viejo, CA (US); Shubham Pradeep Agnihotri, Irvine, CA (US); Casey Taylor Dunn, Mission Viejo, CA (US); Ryan Arens, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/527,197

(22) Filed: Dec. 1, 2023

(65) Prior Publication Data

US 2025/0183454 A1 Jun. 5, 2025

(51) Int. Cl.
| | |
|---|---|
| *E04B 1/38* | (2006.01) |
| *B60L 50/64* | (2019.01) |
| *H01M 10/613* | (2014.01) |
| *H01M 10/625* | (2014.01) |
| *H01M 10/656* | (2014.01) |
| *H01M 50/262* | (2021.01) |

(52) U.S. Cl.
CPC ........... *H01M 50/262* (2021.01); *B60L 50/64* (2019.02); *H01M 10/613* (2015.04); *H01M 10/625* (2015.04); *H01M 10/656* (2015.04); *H01M 2220/20* (2013.01)

(58) Field of Classification Search
CPC .......................... H01M 50/262; H01M 10/656
USPC ............................................................ 52/633
See application file for complete search history.

(56) References Cited

U.S. PATENT DOCUMENTS

| | | | | |
|---|---|---|---|---|
| 3,105,423 | A * | 10/1963 | Reiland ................... | E01C 11/18 52/684 |
| 3,464,661 | A * | 9/1969 | Alesi, Jr. ............... | F16L 3/2235 248/68.1 |
| 3,673,753 | A * | 7/1972 | Anderson ............... | E04C 5/168 52/685 |
| 3,788,025 | A * | 1/1974 | Holmes ................... | E04C 5/168 52/685 |
| 5,016,374 | A * | 5/1991 | Engstrom ........... | G09F 15/0068 52/715 |
| 5,893,252 | A * | 4/1999 | Hardy, Jr. ............... | E04C 5/168 52/685 |
| 6,112,494 | A * | 9/2000 | Hardy, Jr. ................ | E04C 5/20 52/685 |
| 7,461,491 | B1 * | 12/2008 | Sorkin ...................... | E04C 5/20 52/685 |
| 7,859,147 | B2 * | 12/2010 | Dubuc .................. | H02K 11/05 310/71 |
| 7,870,702 | B2 * | 1/2011 | McKay ..................... | E04C 5/20 52/681 |
| 9,157,233 | B2 * | 10/2015 | Gosain .................. | E04B 2/8647 |
| 9,533,600 | B1 | 1/2017 | Schwab et al. | |
| 10,309,110 | B2 * | 6/2019 | Mullaney ................ | E04G 21/12 |

(Continued)

*Primary Examiner* — Basil S Katcheves
(74) *Attorney, Agent, or Firm* — BAKERHOSTETLER

(57) ABSTRACT

Aspects of the disclosure relate to a multi-functional bracket, such as for a battery pack. The disclosed bracket may allow for a simplified and more efficient assembly process for the battery pack using a plastic snap-fit main body, while providing both structural integrity for the pack using a overmolded reinforcement feature, and mounting and alignment for fluid manifolds for the battery modules.

19 Claims, 12 Drawing Sheets

(56) References Cited

U.S. PATENT DOCUMENTS

| | | | | |
|---|---|---|---|---|
| 10,519,660 | B2* | 12/2019 | Evans | F16B 7/0493 |
| 2002/0104285 | A1* | 8/2002 | Schulze | E04B 1/41 |
| | | | | 52/718.04 |
| 2003/0037505 | A1* | 2/2003 | Schulze | E04B 1/41 |
| | | | | 52/677 |
| 2006/0053730 | A1* | 3/2006 | Schmutsch | F16C 29/046 |
| | | | | 52/677 |
| 2008/0011933 | A1* | 1/2008 | Railsback | F16L 11/122 |
| | | | | 248/682 |
| 2011/0139738 | A1* | 6/2011 | Raybuck | A61B 50/13 |
| | | | | 211/85.13 |

* cited by examiner

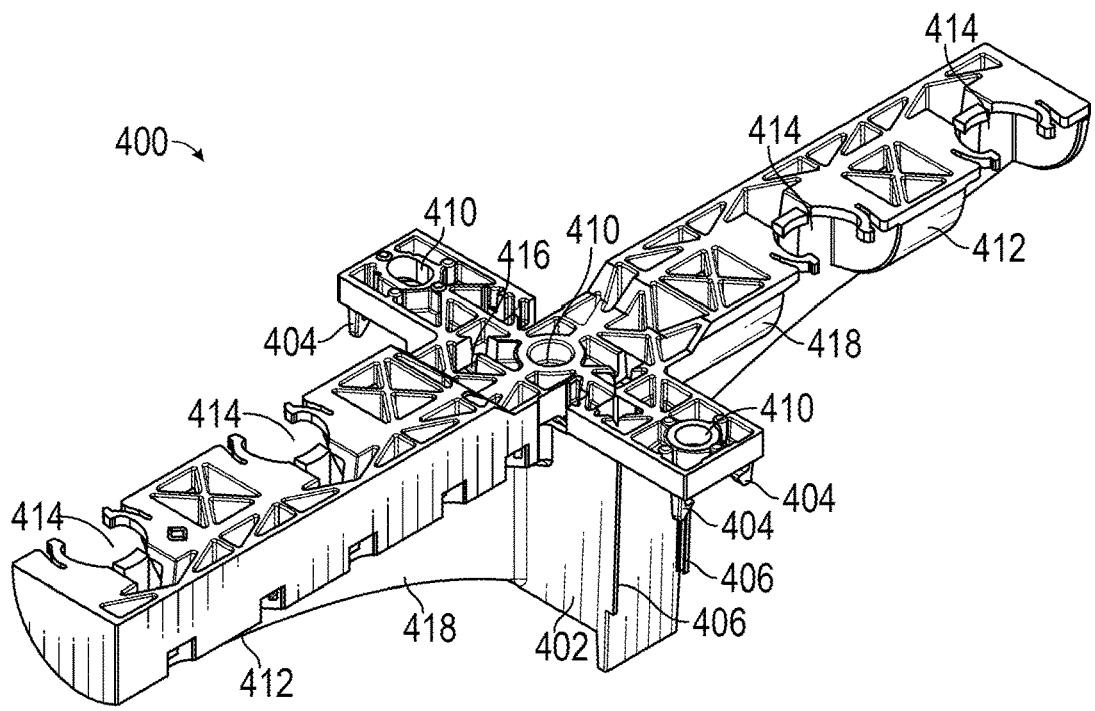
FIG. 4
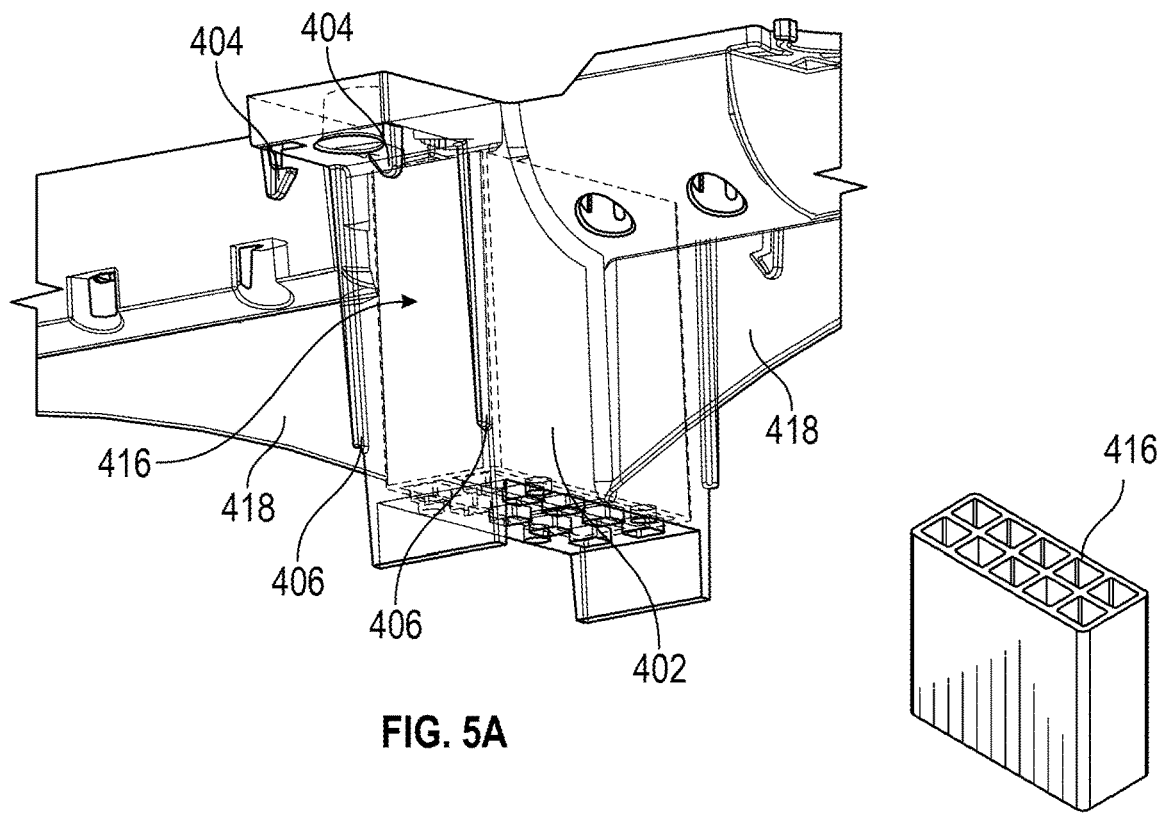
FIG. 5A
FIG. 5B

MULTI-FUNCTIONAL COMPONENT FOR BATTERY PACKS

INTRODUCTION

Batteries are often used as a source of power, including as a source of power for electric vehicles that include wheels that are driven by an electric motor that receives power from the battery.

Aspects of the subject technology can help to improve the manufacturability and/or proliferation of electric vehicles, which can help to mitigate climate change by reducing greenhouse gas emissions.

SUMMARY

Aspects of the subject disclosure relate to a multi-functional component, such as a saddle bracket, for use in a battery pack. The bracket may be configured to snap fit to a structural member of a battery pack frame, such as a cross-member of the battery pack frame. The bracket may include a central portion that snap fits to the structural member, and a pair of wings extending in opposite directions therefrom. Each of the wings may be configured to hold one or more coolant manifolds. The central portion may be overmolded on a reinforcement feature that combines with the structural member of the battery pack frame to provide strength and resilience for the battery pack.

In accordance with aspects of the subject disclosure, an apparatus is provided that includes a bracket that includes a central portion configured to attach to a structural member of a frame for a battery pack, a structural component disposed within the central portion and configured to cooperate with the structural member of the frame to form a cross member for the frame, and an extension having a mounting feature for mounting a fluid manifold to the bracket. The extension may include the mounting feature and an additional mounting feature, and the additional mounting feature may be configured for mounting an additional fluid manifold to the bracket.

The extension may include a first extension that extends in a first direction from the central portion, and the bracket may also include a second extension that extends in a second direction from the central portion. The second extension may include first and second further additional mounting features configured for mounting first and second further additional fluid manifolds. The bracket may also include a first gusset extending along the first extension and configured to support the first extension, and a second gusset extending along the second extension and configured to support the second extension.

The structural component may be formed from a metal and the central portion and the extension of the bracket may be formed from a molded structure that is overmolded onto the structural component. The bracket may also include at least one snap feature, and the at least one snap feature may be configured to attach the bracket to the structural member of the frame using a snap fit. The bracket may also include one or more guide features, the one or more guide features configured to guide the bracket into a notch in the structural member of the frame.

In accordance with other aspects of the disclosure, an apparatus may be provided that includes a multi-functional saddle bracket that includes: a first portion configured to hold one or more coolant lines; an aluminum insert configured to transfer a load to a structural member of a frame; and a second portion overmolded over the aluminum insert and including a fastener-free assembly, the fastener-free assembly having one or more guide features configured to guide the multi-functional saddle bracket along the structural member, and the multi-functional saddle bracket configured to snap onto the structural member. The second portion of the multi-functional saddle bracket may include a central portion of the multi-functional saddle bracket. The aluminum insert may be disposed within the central portion and configured to mate with the structural member of the frame to form a cross member for the frame. The first portion may include an extension from the central portion, the first portion having a mounting feature for mounting a fluid manifold, for the coolant lines, to the multi-functional saddle bracket.

The extension may include the mounting feature and an additional mounting feature, and the additional mounting feature may be configured for mounting an additional fluid manifold to the multi-functional saddle bracket. The extension may include a first extension that extends in a first direction from the central portion, and the multi-functional saddle bracket may also include a second extension that extends in a second direction from the central portion. The second extension may include first and second further additional mounting features configured for mounting first and second further additional fluid manifolds.

The multi-functional saddle bracket may also include a first gusset extending along the first extension and configured to support the first extension, and a second gusset extending along the second extension and configured to support the second extension. The first portion and the second portion of the multi-functional saddle bracket may be formed from a single molded structure that is overmolded onto the aluminum insert. The one or more guide features may be configured to guide the multi-functional saddle bracket into a notch in the structural member of the frame. The multi-functional saddle bracket may also include one or more snap features that are configured to snap the multi-functional saddle bracket onto the structural member of the frame when the multi-functional saddle bracket has been guided into the notch by the one or more guide features.

In accordance with other aspects of the disclosure, a battery pack may be provided that includes a bracket that includes a central portion configured to attach to a structural member of a frame for the battery pack, a structural component disposed within the central portion and configured to cooperate with the structural member of the frame to form a cross member for the frame, and an extension having a mounting feature. The battery pack may also include the structural member; and a fluid line that passes through a notch in the structural member. The bracket may be attached to the structural member within the notch and over the fluid line.

The battery pack may also include an additional structural member mounted to the structural member and the bracket. The structural member, the additional structural member, and the structural component of the bracket may cooperate to form the cross member for the frame. The battery pack may also include a fluid manifold mounted to the mounting feature of the extension, and a coupling line that fluidly couples the fluid manifold to the fluid line.

The battery pack may also include a battery module that includes a plurality of battery cells and a coolant port. The battery module may be mounted to the structural member of the frame such that the coolant port of the battery module is mated to a fluid manifold that is mounted to the mounting feature of the extension on the bracket. The battery pack may be installed in a vehicle, and the plurality of battery cells may be configured to power one or more wheels of the vehicle.

The battery module may include an additional coolant port that is mated to an additional fluid manifold that is mounted to the extension on the bracket. The extension may include a first extension that extends in a first direction from the central portion of the bracket, and the bracket may also include a second extension that extends in a second direction from the central portion. The second extension may include first and second further additional mounting features, and the battery pack may also include an additional battery module having first and second respective further additional coolant ports that are mated to first and second further additional fluid manifolds that are mounted to the first and second respective further additional mounting features on the second extension.

In accordance with other aspects of the disclosure, a method may be provided that includes providing a first portion of a frame for a battery pack, the first portion including at least a base member and a structural member extending from the base member; providing a fluid line into the first portion of the frame by laying the fluid line within a notch in the structural member; installing a bracket over the fluid line in the notch in the structural member; and mounting a fluid manifold that is fluidly coupled to the fluid line to a mounting feature of the bracket. The bracket may include a structural component within a central portion of the bracket, and installing the bracket may include aligning the structural component with the structural member of the frame within the notch.

The method may also include installing a battery module into the frame by mounting a flange of the battery module to the structural member and coupling a fluid port for the battery module to the fluid manifold, the battery module including a plurality of battery cells disposed therein. Installing the bracket may include attaching the bracket to the structural member with a snap fit. The method may also include attaching an additional structural member of the frame to the structural member and the bracket to form a cross member for the frame, the cross member including the structural member, the additional structural member, and the structural component of the bracket.

BRIEF DESCRIPTION OF THE DRAWINGS

Certain features of the subject technology are set forth in the appended claims. However, for purpose of explanation, several embodiments of the subject technology are set forth in the following figures.

FIG. 4 illustrates a top perspective view of a bracket in accordance with one or more implementations.

FIG. 5A illustrates a bottom perspective view of a portion of a bracket in accordance with one or more implementations.

FIG. 5B illustrates a perspective view of a structural component of a bracket in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate a multifunctional saddle bracket for use in a battery pack. The disclosed bracket may allow for a simplified and more efficient assembly process for the battery pack using a plastic snap-fit main body, while providing both structural integrity for the pack using a overmolded reinforcement feature, and mounting and alignment for fluid manifolds for the battery modules.

Figure 1A:
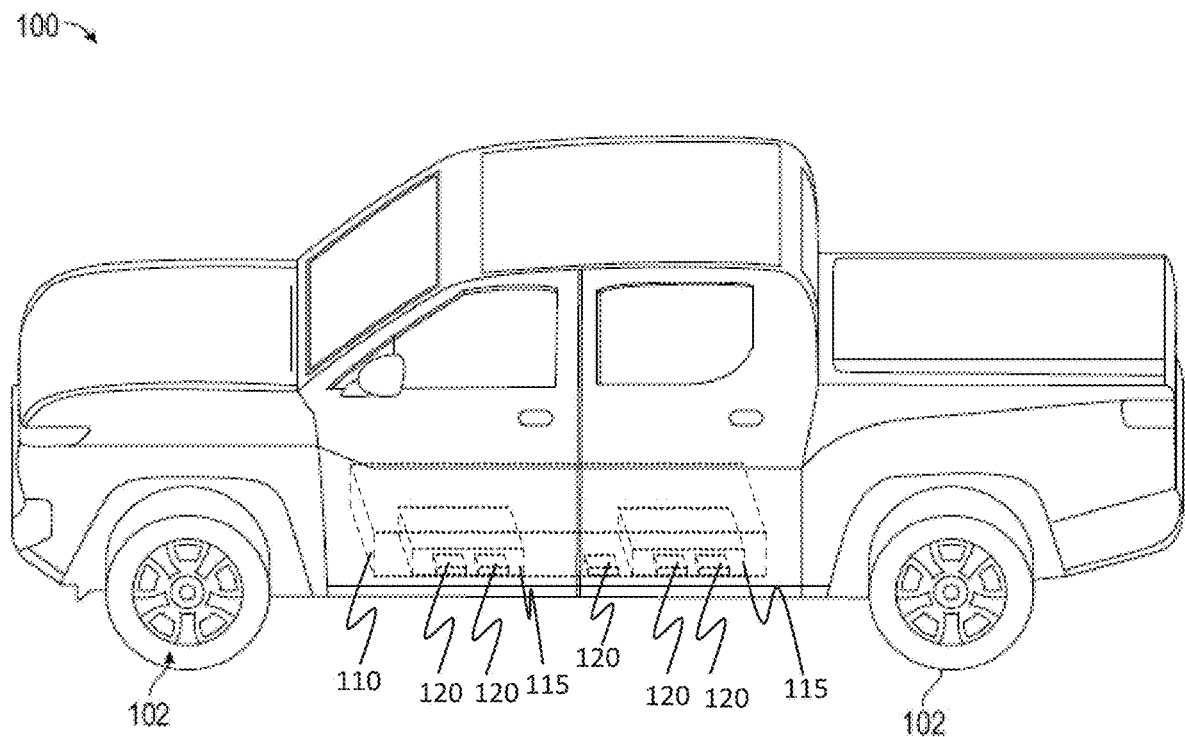
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
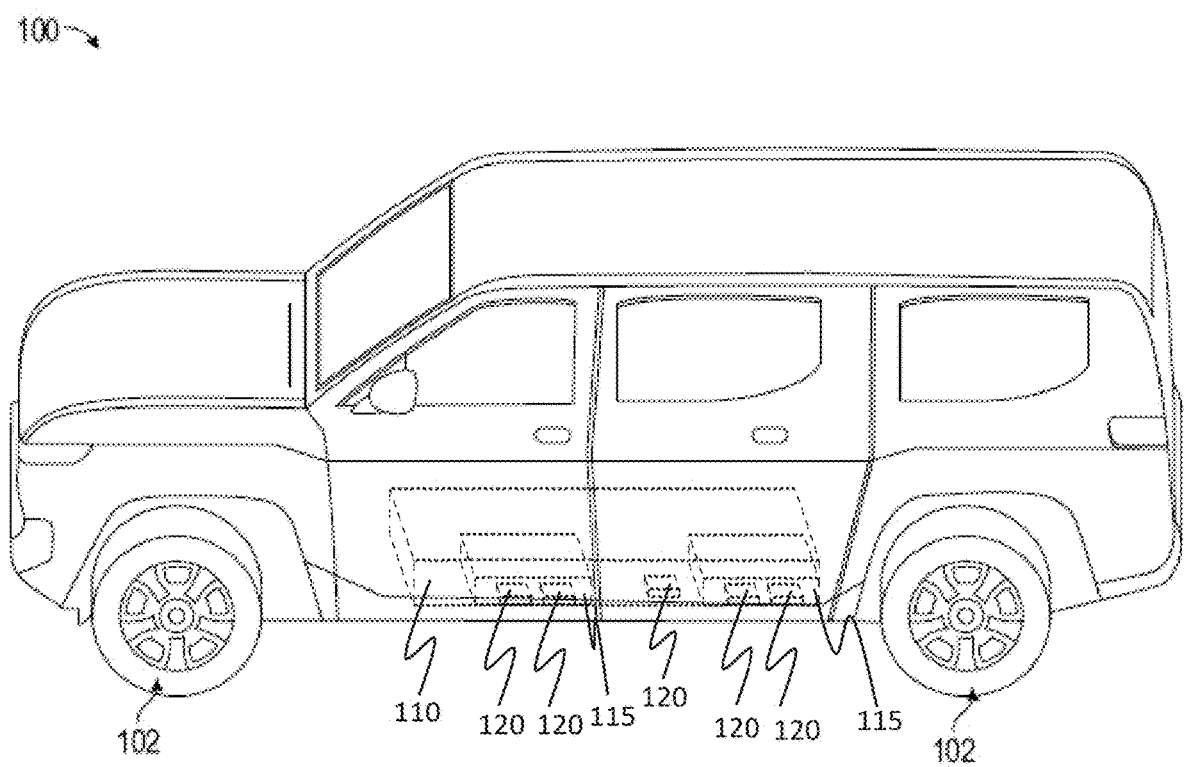

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
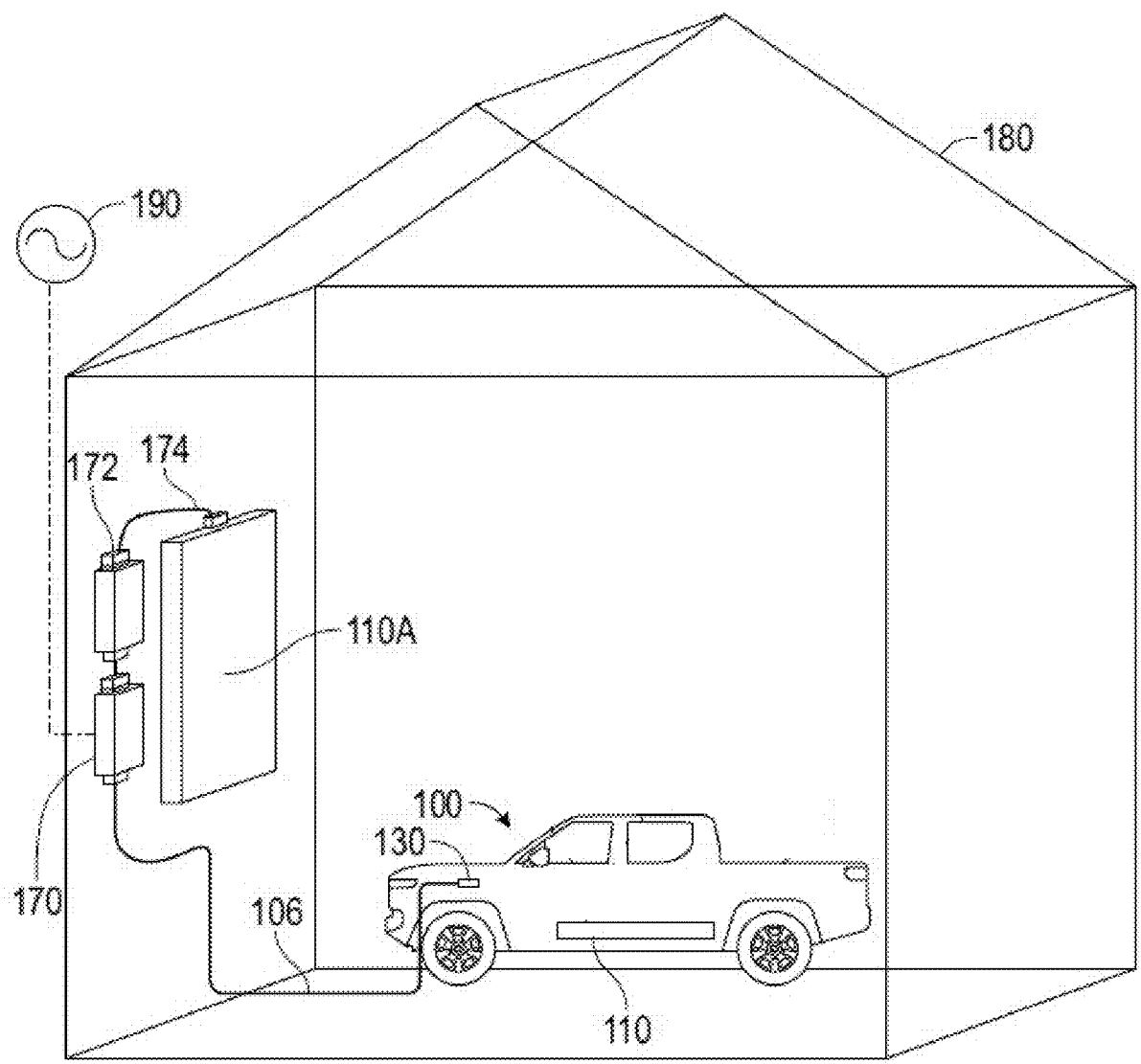
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
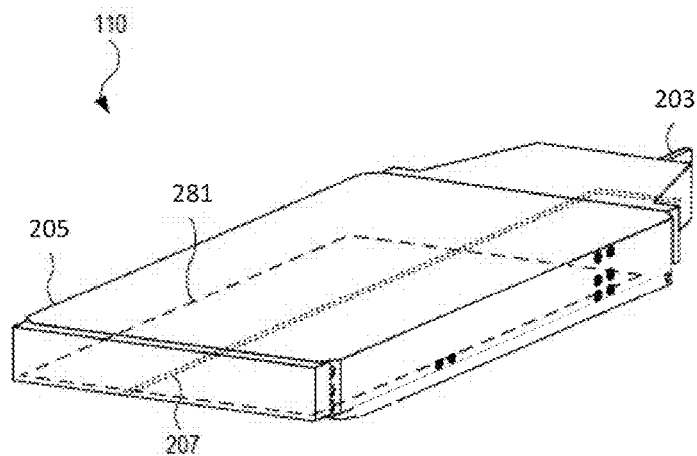
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within an enclosure 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include an enclosure 205 (e.g., also referred to as a battery pack housing, a pack frame, or a frame for the battery pack). For example, the enclosure 205 may house or enclose one or more battery modules 115 and/or one or more battery cells 120, and/or other battery pack components. In one or more implementations, the enclosure 205 may include or form a shielding structure, such as a skid plate, on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the enclosure 205, such as by distributing fluid through the battery pack 110.

For example, the thermal control structures 207 may include one or more fluid lines (e.g., coolant lines or refrigerant lines) and/or may form a part of a thermal/temperature control or heat exchange system that includes one or more thermal components 281 such as plates or bladders that are disposed in thermal contact with one or more battery modules 115 and/or battery cells 120 disposed within the enclosure 205. For example, a thermal component 281 may be positioned in contact with one or more battery modules 115, battery units, batteries, and/or battery cells 120 within the enclosure 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
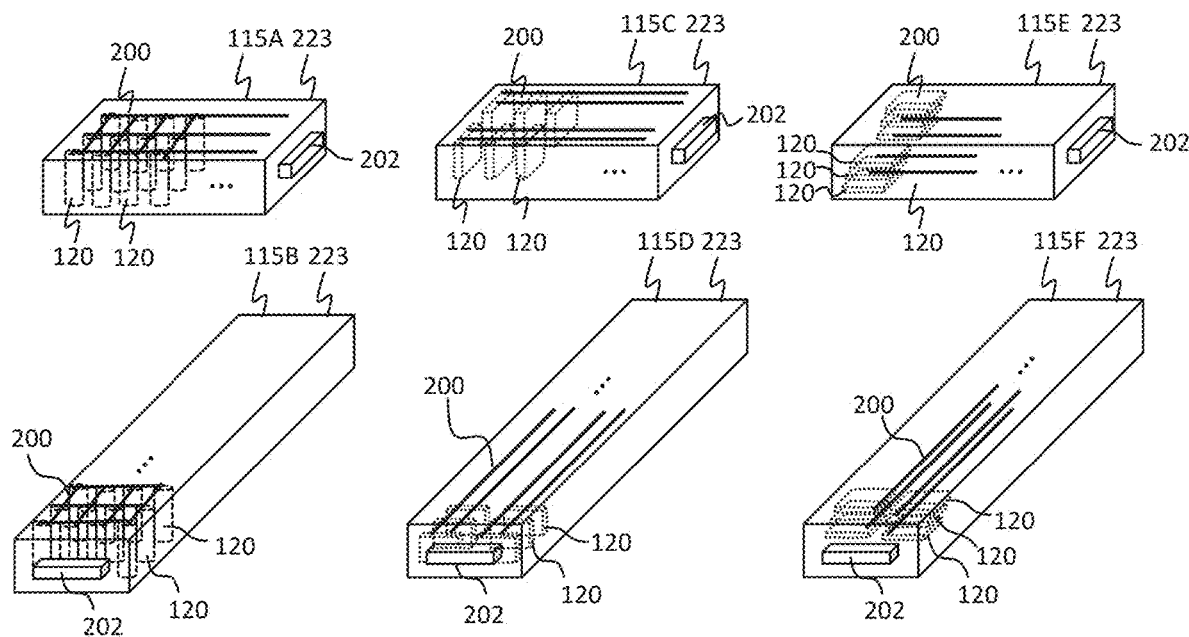
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the enclosure 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the enclosure 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the enclosure 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the enclosure 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the enclosure 205) may include or define a plurality of structures for positioning of the battery cells 120 directly within the enclosure 205.

Figure 2C:
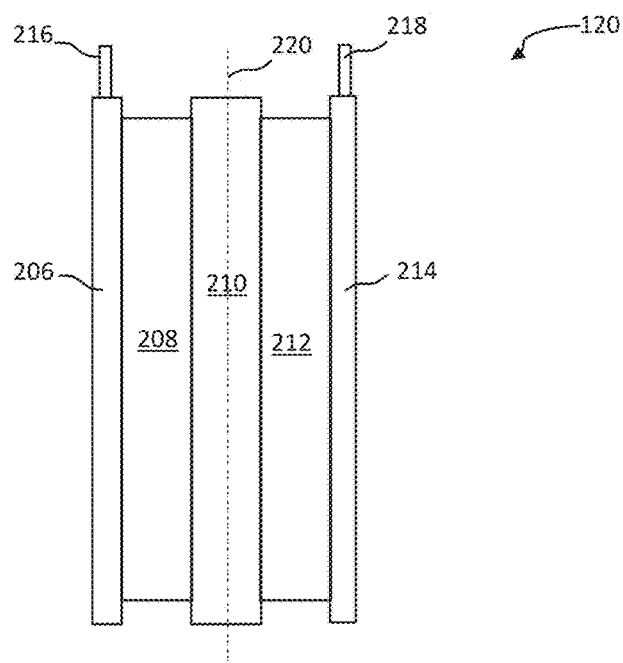
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
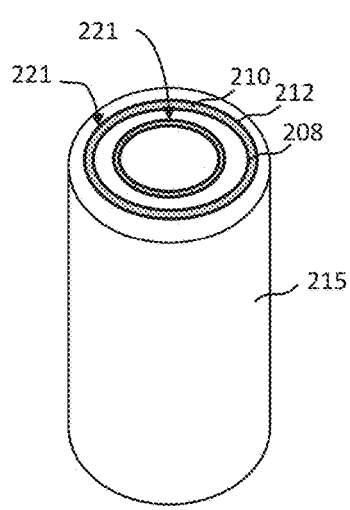
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
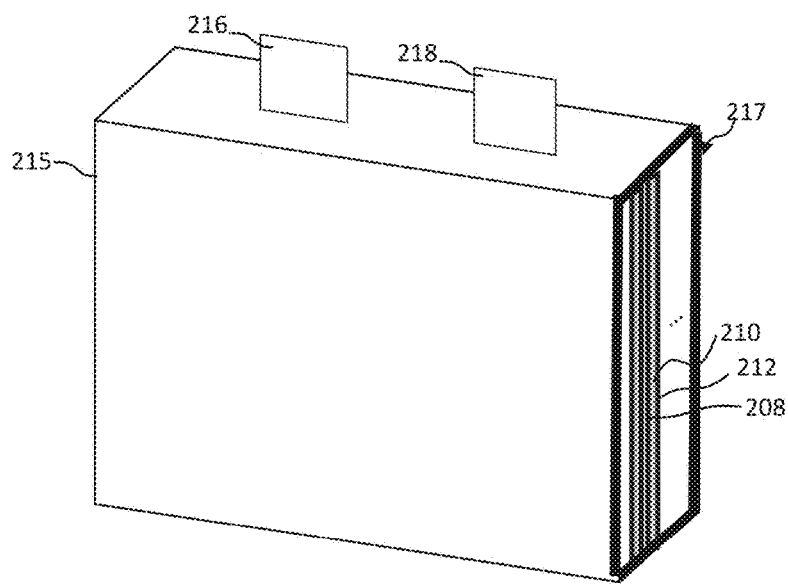
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
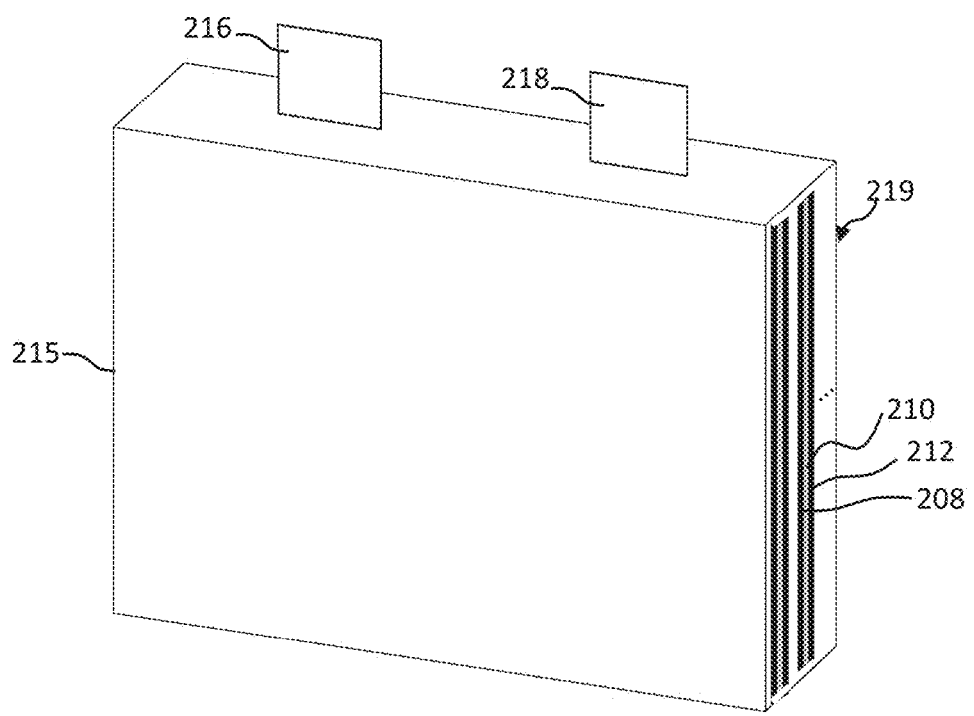
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
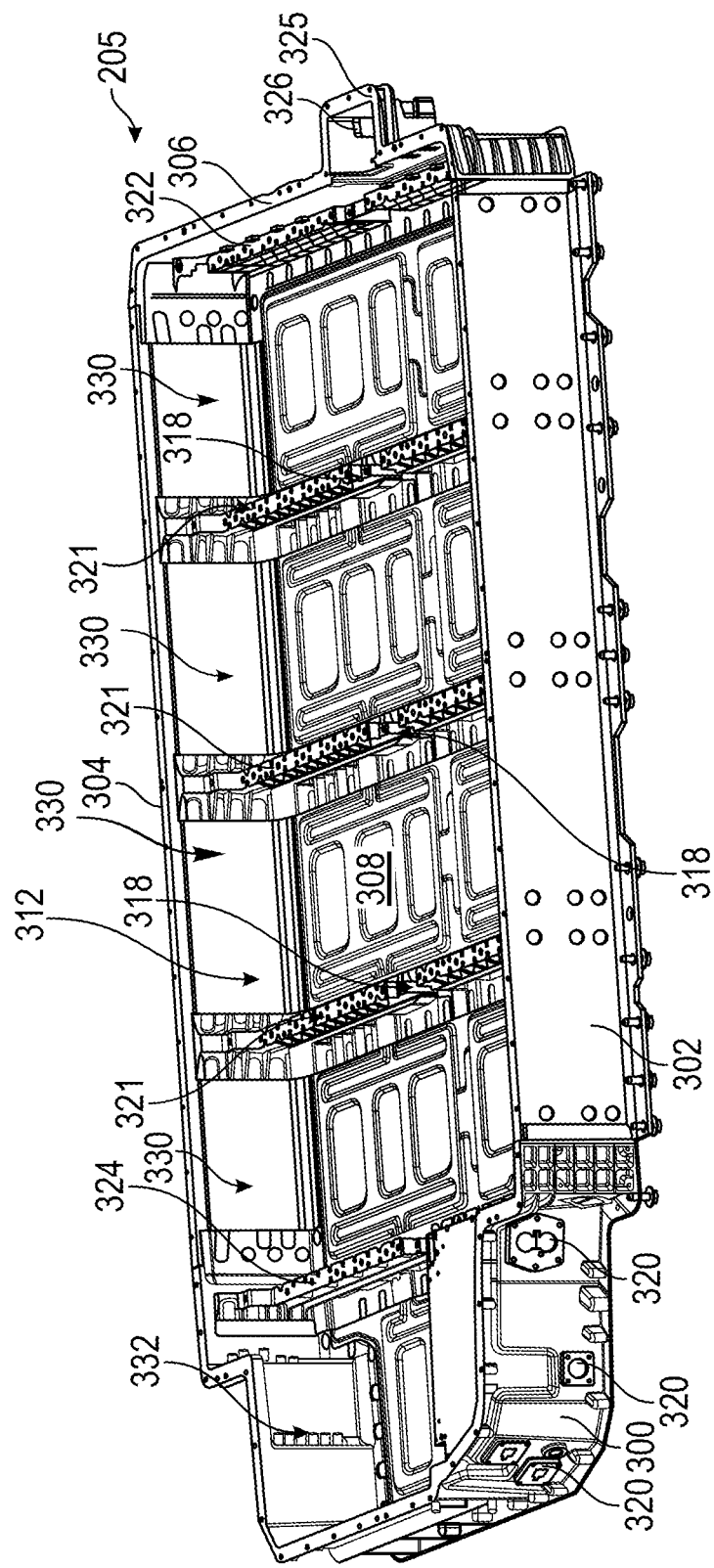
FIG. 3 illustrates a perspective view of a portion of an enclosure for a battery pack in accordance with one or more implementations.

FIG. 3 illustrates top perspective view of an enclosure 205 for the battery pack 110. In this example, the enclosure 205 may include a front portion, such as a front portion 300, a first sidewall, such as a sidewall 302 (e.g., a first siderail or extruded sidewall), a second sidewall, such as a sidewall 304 (e.g., a second siderail or extruded sidewall), a rear portion, such as a rear portion 306, and a base portion, such as a bottom plate 308. For example, the front portion 300 may be a monolithic, unitary member that has been formed from, for example, metal (e.g., aluminum, steel, another metal, and/or an alloy thereof) in a casting operation (e.g., a die casting operation). The front portion 300 may be a casted front member for the enclosure 205, configured for positioning near or toward a front of a vehicle in which battery pack 110 is installed. For example, the front portion 300 may form a front wall of the enclosure 205, and may have an outer surface that defines the front surface of the enclosure 205 and the battery pack 110.

The rear portion 306 may be a monolithic, unitary member that has been formed from, for example, metal (e.g., aluminum, steel, another metal, and/or an alloy thereof) in a casting operation (e.g., a die casting operation). The rear portion 306 may be a casted rear member for the enclosure 205, configured for positioning near or toward a rear of a vehicle in which battery pack 110 is installed. For example, the rear portion 306 may form a rear wall of the enclosure 205, and may have an outer surface that defines the rear surface of the enclosure 205 and the battery pack 110. Battery modules 115 and/or battery cells 120 may be enclosed in a cavity 312 that is defined, in part, by the front portion 300, the sidewall 302, the sidewall 304, the rear portion 306, and the bottom plate 308.

As illustrated in FIG. 3, a portion of the enclosure 205 including the front portion 300, the sidewall 302, the sidewall 304, the rear portion 306, and the bottom plate 308 may be provided as a five-sided box into which battery modules, battery cells, other electrical components, and/or cooling components can be installed to form the battery pack 110. As shown in FIG. 3, the enclosure 205 for the battery pack 110 (e.g., including the five-sided box shown in FIG. 3) may include one or more structural members 321. Each of the structural members 321 may be configured to be positioned between two rows of battery modules. For example, each of the structural members 321 may be used to mount a pair of adjacent battery modules 115. Each of the structural members 321 may form a portion of a cross member for the enclosure 205, as described in further detail hereinafter.

FIG. 3 also shows how the front portion 300 may also include various openings 320 (e.g., for vents such as pressure release valves (PRVs), electrical connectors such as drive unit connectors for coupling electrical power from the battery pack to a drive unit of the vehicle 100, fittings for coolant ports, or the like). In one or more implementations, the structural members 321 may separate sub-cavities 330 within the cavity 312, within which pairs of battery modules can be installed.

FIG. 3 also shows how the rear portion 306 may form (or receive) a structural member 322 for the two rearmost battery modules 115. The structural member 322 may also form a cross-member for the battery pack 110, as discussed in further detail hereinafter. FIG. 3 also shows how the front portion 300 may form (or receive) a structural member 324 for the two frontmost battery modules 115 in the cavity 312, and/or for the battery module 115 mounted in a cavity 332 formed by the front portion 300. The structural member 324 may also form a cross-member for the battery pack 110, as discussed in further detail hereinafter.

FIG. 3 also shows how the rear portion 306 may include an extension 325 that defines a cavity 326 in the rear portion 306. In one or more implementations, the enclosure assembly of FIG. 3, including the front portion 300, the sidewalls 302 and 304, the rear portion 306, and the bottom plate 308 (e.g., and/or the structural members 321, 322, and 324) may be provided, as a five-sided box, to a pack assembly process in which the battery modules 115 (e.g., and additional circuitry such as a high voltage distribution box, one or more pyrofuses, or the like) and/or one or more cooling features can be installed, and onto which a lid can be fastened to close the enclosure 205.

As shown, each of the structural members 321 may include a notch 318. For example, a notch 318 may be disposed substantially at a center of each structural member 321. In one or more implementations, the notches 318 may allow one or more fluid lines (e.g., a coolant line or refrigerant line for providing coolant or refrigerant to the battery cells 120 and/or battery modules 115 that get installed in the cavity 312) to be installed in the battery pack 110 by laying the one or more fluid lines (e.g., pipes or hoses) in the notches 318 of the structural members 321. Providing notches 318 in the structural members 321 with open tops as shown can simplify the installation of the fluid lines in the battery pack 110 (e.g., as compared with threading the fluid line(s) through holes in cross-members or other structural members that do not include open-topped notches), but can also weaken the ability of structural members 321 to withstand and/or distribute an external force (e.g., an impact force) to the battery pack 110.

In order, for example, to facilitate providing structural members 321 with notches 318, without compromising the crosswise strength of the enclosure 205 (e.g., and while also providing other functions), a bracket can be provided that mounts to a structural member 321 within the notch 318 and that provides reinforcing strength to the enclosure 205 (e.g., to a cross-member formed, in part, by the structural member 321 and the bracket mounted thereto). For example, FIG. 4 illustrates a perspective view of a bracket that can be mounted to the structural member 321 within the notch 318, in accordance with one or more implementations. For example, a component 400, possibly also referred to herein as a bracket 400, may be a multi-functional component, such as a saddle bracket that (i) provides reinforcing strength to the enclosure 205 (e.g., to a cross-member formed, in part, by the structural member 321, and the bracket mounted thereto), (ii) simplifies the assembly of the enclosure 205, and (iii) provides mounting features for fluid manifolds for coolant lines within the battery pack 110.

As shown in FIG. 4, a bracket 400 (e.g., a multi-functional saddle bracket) may be provided that includes a central portion 402. The central portion 402 may be configured to attach to a structural member 321 of a frame (e.g., enclosure 205) for a battery pack 110. The bracket 400 may also include a structural component 416 disposed within the central portion 402. For example, the structural component 416 may be configured to cooperate (e.g., mate or otherwise structurally combine) with the structural member 321 of the frame to form a cross member for the frame. For example, the structural component 416 may be formed from a metal (e.g., aluminum or steel), and may be disposed within an overmolded structure that forms the remainder of the bracket 400.

As shown, the bracket 400 may also include one or more extensions 412, each having one or more mounting features 414. For example, each of the mounting features 414 may be configured for mounting one or more fluid manifolds to the bracket 400 (e.g., as described in further detail hereinafter). In one or more implementations, the central portion 402 and the extensions 412 of the bracket 400 may be formed from a molded structure (e.g., a molded plastic) that is overmolded onto the structural component 416.

As shown in the example of FIG. 4, the central portion 402 may have an elongate dimension that extends in a first direction, and the extensions 412 (e.g., wings) may extend from the central portion 402 in opposite directions that are each perpendicular to the first direction. For example, when attached to a structural member 321 of the enclosure 205, the central portion 402, including the structural component 416, may extend along the same direction as the structural member 321 to which the bracket 400 is attached.

In the example of FIG. 4, the bracket 400 includes two extensions 412, and each of the extensions 412 includes two mounting features 414. As shown, a first extension (e.g., a first one of the extensions 412) may extend in a first direction from the central portion 402, and a second extension (e.g., a second one of the extensions 412) may extend in a second direction from the central portion 402. As shown, the bracket 400 may also include one or more gussets 418 extending along the one or more respective extensions 412 (e.g., along a bottom of each of the extensions 412). For example, each of the gussets 418 may be configured to support the respective extension 412. As shown, the central portion 402 of the bracket 400 may include one or more mating features (e.g., openings 410) that are configured to mate with an additional structural member (e.g., a top portion of a cross member or a pin extending thereto) of the enclosure 205, as will be discussed in further detail hereinafter.

As shown in FIG. 4, the bracket 400 may also include one or more attachment features 404. For example, the attachment features 404 may be configured to attach the bracket 400 to a structural member 321 of the enclosure 205. In the example of FIG. 4, the attachment features 404 are implemented as snap features, which may be configured to attach the bracket 400 to the structural member 321 of the enclosure 205 using a snap fit (e.g., by deforming as the bracket 400 is moved into position, and the resiliently snapping back to grip a corresponding feature of the structural member 321). This may reduce the complexity, time, and/or force/strength required for installing the bracket 400, such as relative to other implementations in which the bracket 400 is a fully metal bracket that is screwed or bolted to the structural member 321. This may improve the overall manufacturability of the battery pack 110 and/or any apparatus (e.g., vehicle, building, etc.) in which the battery pack 110 is installed. As shown, the bracket 400 may also include one or more guide features 406. For example, the guide features 406 may be configured to guide the bracket 400 into a notch 318 in the structural member 321 of the enclosure 205.

FIG. 5A illustrates a bottom perspective view of a portion of the bracket 400, in which a fastener-free assembly, for attachment of the bracket 400 to a structural member 321 of the enclosure 205), can be seen. As shown, the fastener-free assembly of the bracket 400 may include the attachment features 404 and the guide features 406. As shown, the guide features 406 may be implemented as rails that extend along outer edges of the central portion 402. When attaching the bracket 400 to the structural member 321, the guide features 406 may guide the central portion 402 along the structural member 321, such as by sliding along and/or within one or more features of the notch 318, to guide the bracket 400 into a position in which the attachment features 404 attach to (e.g., snap onto) one or more corresponding attachment features on the structural member 321. Providing a fastener-free assembly for the bracket, as shown in FIG. 5A, can reduce the cycle time for installation and make the bracket 400 easy to assemble to the enclosure 205 (e.g., in contrast with a bracket that is screwed or bolted onto the assembly). In the example of FIG. 5, the body of the bracket 400 is shown in partial transparency so that the structural component 416 can be seen within the central portion 402. FIG. 5B illustrates an example implementation of the structural component 416, which can be formed in the central portion 402 of bracket 400 by overmolding a material (e.g., a plastic) onto the structural component 416.

Figure 6:
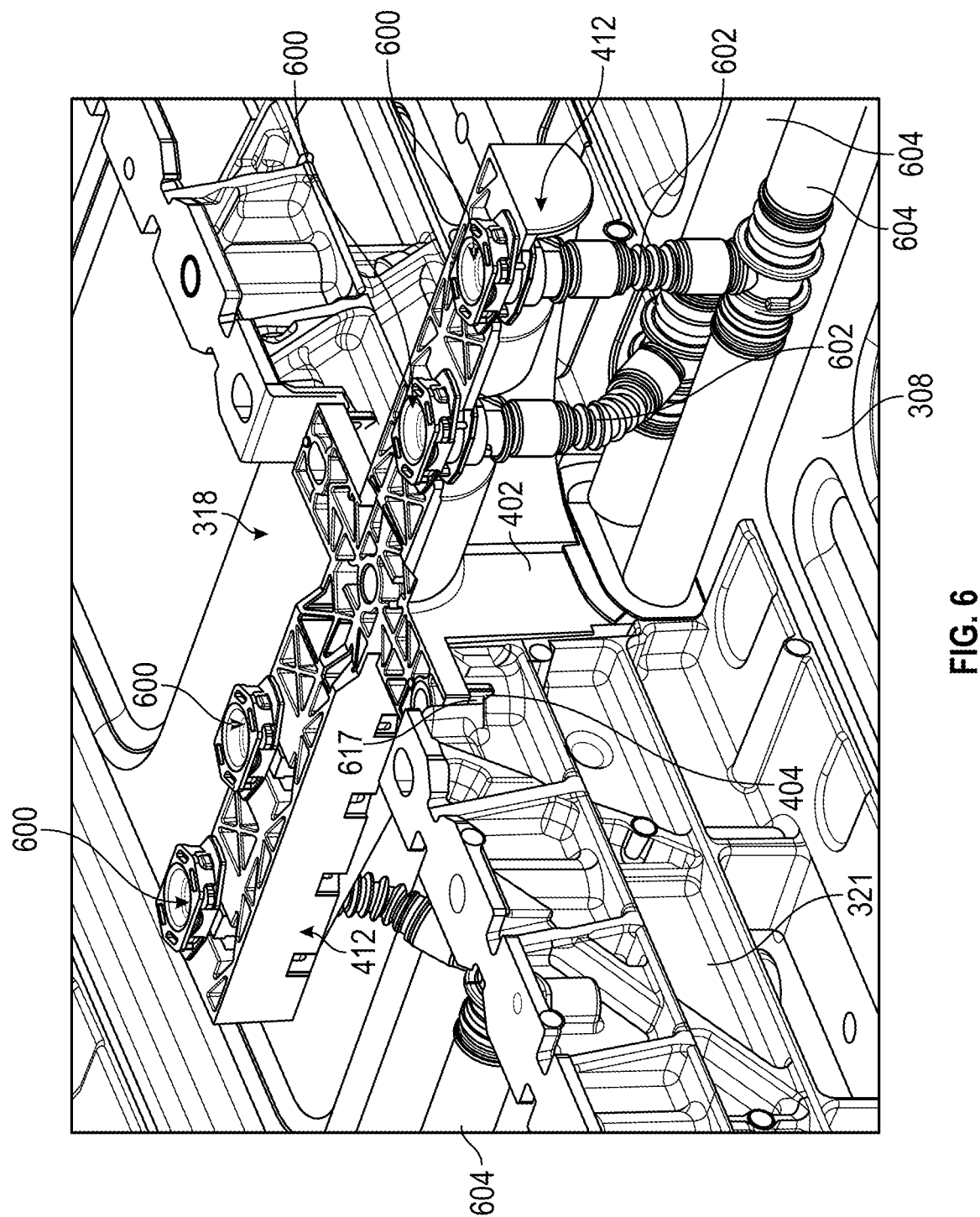
FIG. 6 illustrates a perspective view of a portion of a battery pack including a bracket in accordance with one or more implementations.

FIG. 6 illustrates a perspective view of a portion of the battery pack 110 after installation of the bracket 400 in the enclosure 205. As shown, the attachment features 404 may each be snap fit to a corresponding feature 617 of the structural member 321 when central portion 402 of the bracket 400 is installed in the notch 318 of the structural member 321. FIG. 6 also shows how one or more fluid lines 604 (e.g., coolant lines) may pass through the notch 318 beneath the central portion 402 of the bracket 400. For example, after laying the fluid line(s) 604 in the notch 318, the bracket 400 may be slid downward into the notch and attached to the structural member 321 within the notch 318 and over the fluid line(s) 604.

In the example of FIG. 6, a fluid manifold 600 is mounted to each of the mounting features 414 in each of the extension 412 on the bracket 400. As shown, a coupling line 602 may fluidly couple each of the fluid manifolds 600 to one or more of the fluid lines 604. In this way, a coolant or refrigerant flowing through the fluid line(s) 604 may be provided to and/or from the fluid manifolds 600 mounted to the bracket 400. In one or more implementations, each of the fluid manifolds 600 may be held, by the bracket 400, in a position in which a fluid port of a corresponding battery module will mate with that fluid manifold 600 when the battery module is installed in the enclosure 205. For example, first and second fluid manifolds 600 on each extension 412 may mate, respectively, with an inlet port and an outlet port of a cold plate of a battery module 115.

Figure 7:
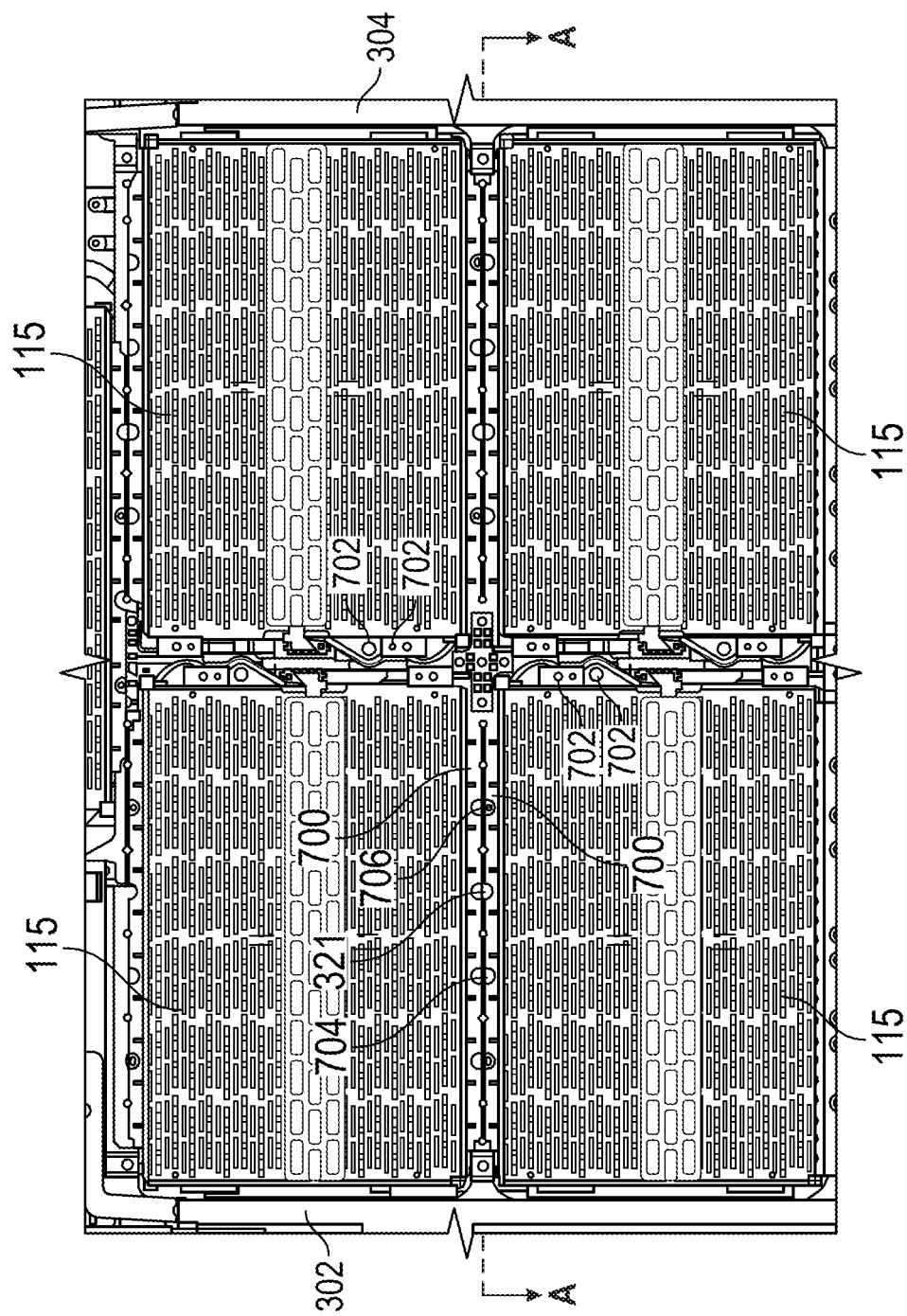
FIG. 7 illustrates a top view of a portion of a battery pack having a bracket in accordance with one or more implementations.

For example, FIG. 7 illustrates a top view of a portion of a battery pack 115 in which the bracket 400, and multiple battery modules 115, have been installed. For example, each of the battery modules 115 may include a flange 700 that is configured to mount to one of the structural members 321. For example, the flanges 700 and/or the structural members 321 may have datuming and/or alignment features that facilitate guiding the battery modules 115 into engagement with the structural members 321 at the correct locations. For example, a pin 706 or other fastener or locating structure may pass through a cold plate 704 of each battery module 115 into one of the structural members 321 (e.g., to align, locate, and/or secure the cold plate 704, and the battery module in which the cold plate is disposed, relative to the structural member 321). Because the bracket 400, which holds the fluid manifolds 600 in position, is also attached and located to the structural member 321, the battery module 115, the cold plate 704, the bracket 400, and the fluid manifolds 600 may all be relatively positioned with respect to the structural member 321, thereby reducing tolerances and facilitating alignment of fluid ports 702 on the battery modules (e.g., coolant ports, such as inlet and outlet ports to the cold plate 704 for each battery module) with the fluid manifolds 600, as the battery module 115 is installed in the enclosure 205.

Figure 8:
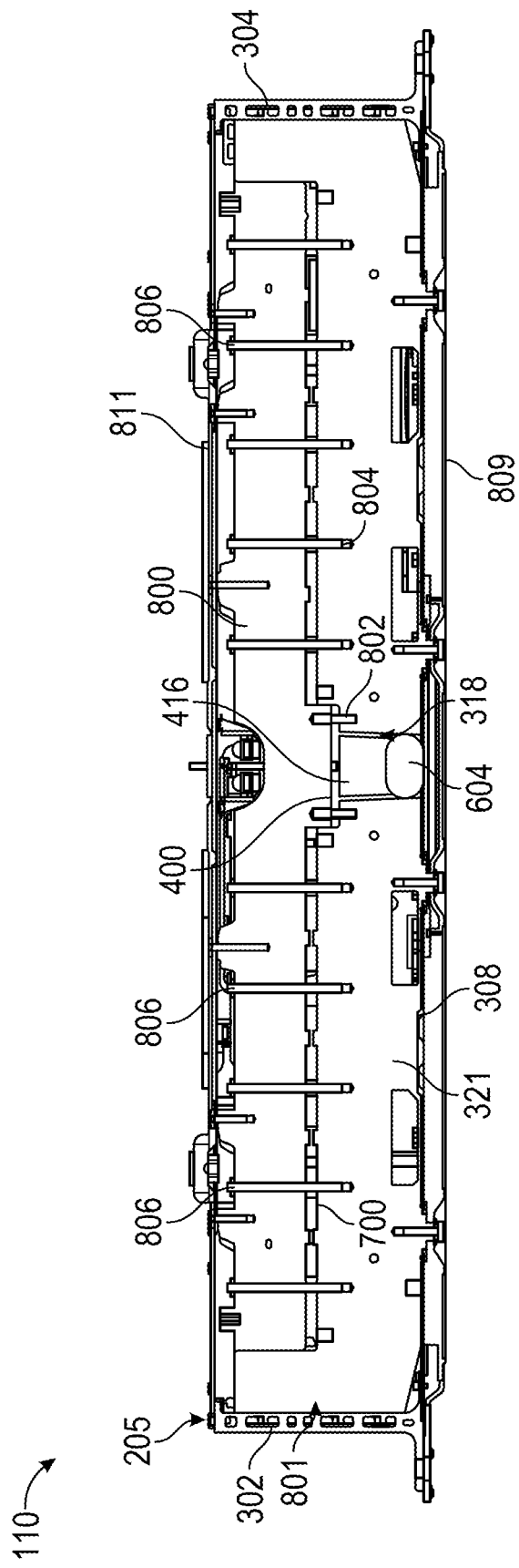
FIG. 8 illustrates a cross-sectional end view of a battery pack having a bracket in accordance with one or more implementations.

As described herein, an additional structural member may be mounted to the structural member 321 and the bracket 400 to form a cross member for the enclosure 205 and the battery pack 110. For example, FIG. 8 illustrates a cross-sectional end view (e.g., along the line A-A of FIG. 7) of a portion of a battery pack 110 in which a structural member 800 is mounted to the structural member 321 and the bracket 400, to form a cross member 801 for the enclosure 205 and the battery pack 110.

As shown, the structural member 321 may span substantially the entire width of the cavity 312 within the enclosure 205, from the sidewall 302 to the sidewall 304. The flange 700 of the battery module(s) 115 may lay on a top surface of the structural member 321. The structural member 800 may be placed over the flange(s) 700 and pinned to the structural member 321 (e.g., by pins, screws, bolts, or other fasteners 806 that pass through the flange(s) 700 into openings 804, such as blind mates, in the structural member 321). As shown, one or more pins 802 may extend through the bracket 400 (e.g., through one or more of the openings 410 shown in FIG. 4) into openings in the structural member 321 (e.g., below the bracket 400) and into openings in the structural member 800 (e.g., above the bracket 400). In this way, the structural member 321, the bracket 400, and the structural member 800 may combine or cooperate to form the cross member 801 that spans the width (e.g., and the height) of the enclosure 205.

For example, without the presence of the structural component 416 of the bracket 400 within the notch 318, an impact to the sidewall 302 or the sidewall 304 could cause the structural member 800 to bend into the notch 318, allowing more deformation of the cross member 801 and the enclosure 205 than desired. With the structural component 416 within the notch 318, such bending or deformation of the structural member 800 and/or the structural member 321 can be prevented, even in the presence of an impact force to the sidewall 302 and/or the sidewall 304. Thus, the bracket 400 may be a multi-functional bracket that provides mechanical strength to the cross member 801, that holds and aligns the fluid manifolds 600, and that simplifies and eases the assembly of the battery pack 110. FIG. 8 also shows how a skid plat 809 may be attached to the bottom of the battery pack 110, and a lid 811 may be attached to the sidewalls 302 and 304 (e.g., and the front portion 300 and the rear portion 306) to close the enclosure 205.

As illustrated by FIGS. 3-11, in one or more implementations, a battery pack 110 may include a bracket 400 that includes a central portion 402 configured to attach to a structural member 321 of a frame (e.g., enclosure 205) for the battery pack 110; a structural component 416 disposed within the central portion and configured to cooperate with the structural member of the frame to form a cross member 801 for the frame; and an extension 412 having a mounting feature 414. As shown, the battery pack 110 may also include the structural member 321, and a fluid line 604 that passes through a notch 318 in the structural member 321.

The bracket 400 may be attached to the structural member 321 within the notch 318 and over the fluid line 604. As shown, the battery pack 110 may also include an additional structural member 800 mounted to the structural member 321 and the bracket 400. The structural member 321, the additional structural member 800, and the structural component 416 of the bracket 400 may cooperate to form the cross member 801 for the frame. As shown, the battery pack 110 may also include a fluid manifold 600 mounted to the mounting feature 414 of the extension 412, and a coupling line 602 that fluidly couples the fluid manifold 600 to the fluid line 604.

As shown, the battery pack 110 may also include a battery module 115 having a plurality of battery cells 120 and a coolant port (e.g., fluid port 702). The battery module 115 may be mounted to the structural member 321 of the frame such that the coolant port of the battery module 115 is mated to a fluid manifold 600 that is mounted to the mounting feature 414 of the extension on the bracket. As shown in FIG. 8, the battery module 115 may include an additional coolant port (e.g., an additional fluid port 702) that is mated to an additional fluid manifold 600 that is mounted to the extension 412 on the bracket. The extension 412 may be a first extension that extends in a first direction from the central portion 402 of the bracket 400, and the bracket 400 may also include a second extension 412 that extends in a second direction from the central portion 402. The second extension may include first and second further additional mounting features 414, the battery pack 110 may also include an additional battery module 115 having first and second respective further additional coolant ports (e.g., an additional fluid ports 702) that are mated to first and second further additional fluid manifolds 600 that are mounted to the first and second respective further additional mounting features 414 on the second extension 412.

As illustrated by FIGS. 3-11, in one or more implementations, an apparatus (e.g., battery pack 110, vehicle 100, building 180, or another apparatus) may include a multi-functional saddle bracket 400. The multi-functional saddle bracket 400 may include a first portion (e.g., an extension 412) configured to hold one or more coolant lines (e.g., by holding one or more fluid manifolds 600 that are coupled to the coolant lines); a structural component 416 (e.g., an aluminum insert) that is configured to transfer a load (e.g., an impact load from an impact to the enclosure 205 and/or a vehicle 100 in which the enclosure 205 having the multi-functional saddle bracket 400 is implemented, a structural load such as load from one or more other components or structures that are mounted to, on, or within the enclosure 205, another load, and/or energy associated with a load) to a structural member 321 of a frame (e.g., enclosure 205) for the apparatus; and a second portion (e.g., central portion 402) overmolded over the aluminum insert and including a fastener-free assembly (e.g., as shown in FIGS. 4 and 5A). The fastener-free assembly may include one or more guide features 406 configured to guide the multi-functional saddle bracket 400 along the structural member 321 (e.g., into a notch 318 in the structural member 321), and one or more snap features 404 configured to snap the multi-functional saddle bracket 400 onto the structural member 321. In these implementations, the first portion (e.g., the extension(s) 412) and the second portion (e.g., central portion 402) of the multi-functional saddle bracket may be formed from a single molded structure that is overmolded onto the structural component 416. In these implementations, the second portion may be a central portion 402; the aluminum insert may be disposed within the central portion 402 and configured to mate with the structural member 321 of the frame to form a cross member 801 for the frame; and the first portion may form an extension 412 from the central portion 402, the first portion having a mounting feature 414 for mounting a fluid manifold 600, for the coolant line, to the multi-functional saddle bracket 400.

Figure 9:
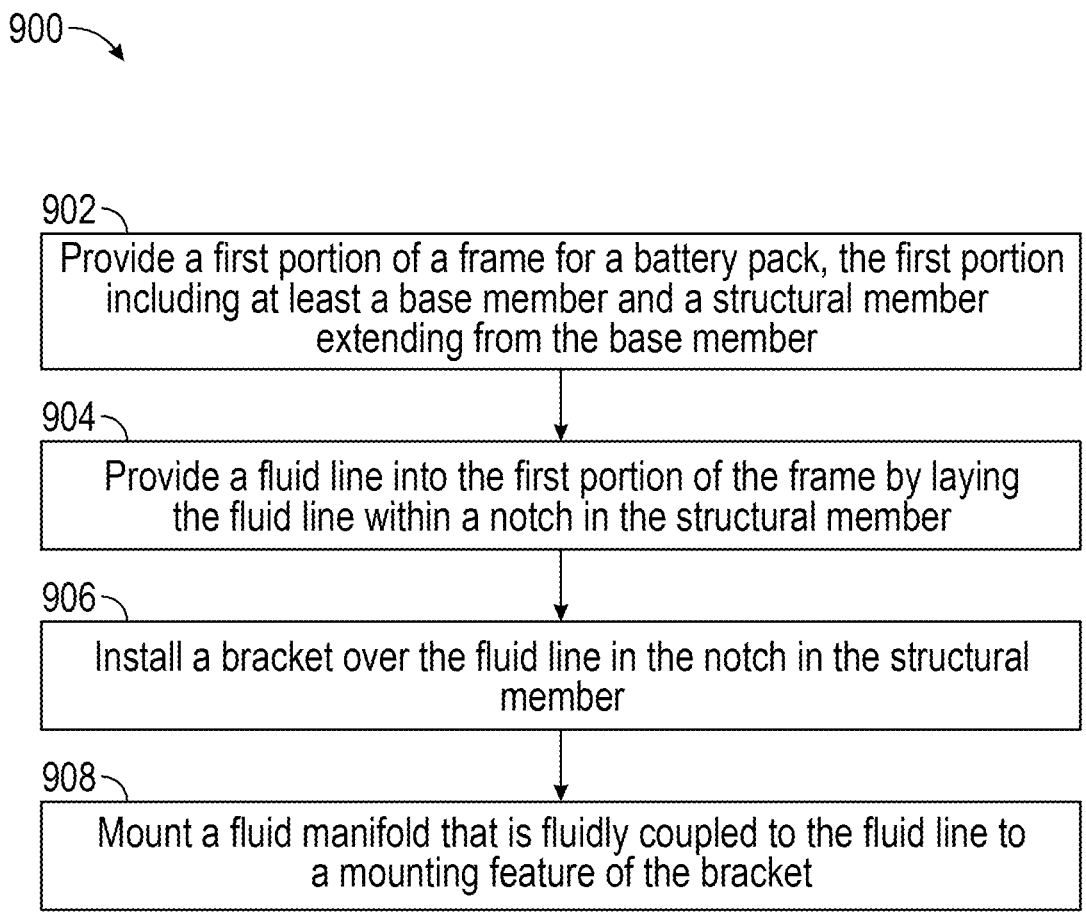
FIG. 9 illustrates a flow chart of illustrative operations that may be performed for assembling a battery pack in accordance with one or more implementations.

FIG. 9 illustrates a flow diagram of an example process 900 that may be used for assembling a battery pack, in accordance with implementations of the subject technology. For explanatory purposes, the process 900 is primarily described herein with reference to the battery pack 110 of FIGS. 1A-2A. However, the process 900 is not limited to the battery pack 110 of FIGS. 1A-2A, and one or more blocks (or operations) of the process 900 may be performed by or form one or more other structural components of other suitable moveable apparatuses, devices, or systems. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, a first portion of a frame (e.g., enclosure 205) for a battery pack may be provided. The first portion may include at least a base member (e.g., bottom plate 308) and a structural member (e.g., structural member 321) extending from the base member. The first portion may include additional features and/or components, such as a front portion (e.g., front portion 300), a rear portion (e.g., rear portion 306), and/or one or more sidewalls (e.g., sidewalls 302 and/or 304). The first portion may include multiple structural members. Each of the structural members may span the width of the first portion of the frame, and may include a mounting surface for mounting one or more battery modules and/or battery cells thereto.

At block 904, a fluid line (e.g., one or more fluid lines 604) may be provided into the first portion of the frame by laying the fluid line within a notch (e.g., notch 318) in the structural member. For example, laying the fluid line within the notch may include laying the fluid line into the notch via an open top of the notch (e.g., in contrast with feeding the fluid line through a bounded hole).

At block 906, a bracket (e.g., a multi-functional bracket, such as bracket 400) may be installed over the fluid line in the notch in the structural member (e.g., as shown in FIGS. 7 and 8). In one or more implementations, the bracket may include a structural component (e.g., structural component 416) within a central portion (e.g., central portion 402) of the bracket, and installing the bracket may include aligning the structural component with the structural member of the frame within the notch. In one or more implementations, installing the bracket may include attaching the bracket to the structural member with a snap fit (e.g., using attachment features 404). In one or more implementations, installing the bracket may include sliding the bracket into the notch using one or more guide features 406 on the central portion 402 of the bracket.

At block 908, a fluid manifold (e.g., fluid manifold 600) that is fluidly coupled to the fluid line (e.g., via a coupling line 602) may be mounted to a mounting feature (e.g., mounting feature 414) of the bracket. For example, mounting the fluid manifold to the mounting feature may include snapping or pressing the fluid manifold into the mounting feature. In one or more implementations, the process 900 may also include attaching an additional structural member (e.g., structural member 800) of the frame to the structural member and the bracket to form a cross member (e.g., cross member 801) for the frame, the cross member including the structural member, the additional structural member, and the structural component of the bracket.

In one or more implementations, the process 900 may also include installing a battery module (e.g., battery module 115) into the frame by mounting a flange (e.g., flange 700) of the battery module to the structural member and coupling a fluid port (e.g., fluid port 702) for the battery module to the fluid manifold, the battery module including a plurality of battery cells (e.g., battery cells 120) disposed therein. Coupling the fluid port to the fluid manifold may include moving the battery module into an aligned position, such that the fluid port is in alignment with the fluid manifold, using the structural member.

Aspects of the subject technology can help improve the manufacturability and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
a multi-functional saddle bracket comprising:
a first portion having a mounting feature for mounting a fluid manifold, for one or more coolant lines, to the multi-functional saddle bracket;
an aluminum insert configured to transfer a load to a structural member of a frame;
a central portion overmolded over the aluminum insert and including a fastener-free assembly, the fastener-free assembly having one or more guide features configured to guide the multi-functional saddle bracket along the structural member, and the multi-functional saddle bracket configured to snap onto the structural member, wherein the first portion comprises a first extension that extends in a first direction from the central portion; and
a first gusset extending along the first extension and configured to support the first extension.

2. The apparatus of claim 1, wherein:
the aluminum insert is disposed within the central portion and configured to mate with the structural member of the frame to form a cross member for the frame.

3. The apparatus of claim 2, wherein the first extension comprises the mounting feature and an additional mounting feature, and wherein the additional mounting feature is configured for mounting an additional fluid manifold to the multi-functional saddle bracket.

4. The apparatus of claim 3, wherein the multi-functional saddle bracket further comprises a second extension that extends in a second direction from the central portion, wherein the second extension comprises first and second further additional mounting features configured for mounting first and second further additional fluid manifolds.

5. The apparatus of claim 4, wherein the multi-functional saddle bracket further comprises a second gusset extending along the second extension and configured to support the second extension.

6. The apparatus of claim 1, wherein the first portion and the central portion of the multi-functional saddle bracket are formed from a single molded structure that is overmolded onto the aluminum insert.

7. The apparatus of claim 1, wherein the one or more guide features are configured to guide the multi-functional saddle bracket into a notch in the structural member of the frame, and wherein the multi-functional saddle bracket further comprises one or more snap features that are configured to snap the multi-functional saddle bracket onto the structural member of the frame when the multi-functional saddle bracket has been guided into the notch by the one or more guide features.

8. A battery pack, comprising:
a multi-functional saddle bracket comprising:
a metal insert;
a central portion overmolded onto the metal insert, wherein the central portion comprises one or more guide features on an external surface thereof, the one or more guide features configured to guide the multi-functional saddle bracket into position within a notch in a structural member of a frame external to the multi-functional saddle bracket, and wherein the central portion comprises an overmolded material that aligns the metal insert with the one or more guide features to position to the metal insert to transfer a load on the multi-functional saddle bracket to the structural member of the frame; and a first extension that extends from the central portion and includes one or more mounting features that each are sized and positioned to hold a coolant line; and a first gusset extending along the first extension and configured to support the first extension.

9. The battery pack of claim 8, further comprising:
the structural member; and
a fluid line that passes through a notch in the structural member,
wherein the multi-functional saddle bracket is attached to the structural member within the notch and over the fluid line.

10. The battery pack of claim 9, further comprising an additional structural member mounted to the structural member and the bracket, wherein the structural member, the additional structural member, and the metal insert of the multi-functional saddle bracket cooperate to form a cross member for the frame.

11. The battery pack of claim 9, further comprising a fluid manifold comprising the coolant line and mounted to one of the one or more mounting features of the first extension, and a coupling line that fluidly couples the fluid manifold to the fluid line.

12. The battery pack of claim 11, further comprising a battery module comprising a plurality of battery cells and a coolant port, wherein the battery module is mounted to the structural member of the frame such that the coolant port of the battery module is mated to the fluid manifold that is mounted to the one of the one or more mounting features of the first extension on the bracket.

13. The battery pack of claim 12, wherein the battery pack is installed in a vehicle, and wherein the plurality of battery cells are configured to power one or more wheels of the vehicle.

14. The battery pack of claim 12, wherein the battery module further comprises an additional coolant port that is mated to an additional fluid manifold that is mounted to another of the one or more mounting features of the first extension on the multi-functional saddle bracket.

15. The battery pack of claim 14, wherein the multi-functional saddle bracket further comprises a second extension that extends in a second direction from the central portion, wherein the second extension comprises first and second additional mounting features, wherein the battery pack further comprises an additional battery module having first and second respective further additional coolant ports that are mated to first and second further additional fluid manifolds that are mounted, respectively to the first and second additional mounting features on the second extension.

16. A multi-functional saddle bracket comprising:
a metal insert;
a central portion overmolded onto the metal insert, wherein the central portion comprises one or more guide features on an external surface thereof, the one or more guide features configured to guide the multi-functional saddle bracket into position within a notch in a structural member of a frame external to the multi-functional saddle bracket, and wherein the central portion comprises an overmolded material that aligns the metal insert with the one or more guide features to position the metal insert to transfer a load on the multi-functional saddle bracket to the structural member of the frame;
a first extension that extends from the central portion and includes one or more mounting features that each are sized and positioned to hold a coolant line; and
a first gusset extending along the first extension and configured to support the first extension.

17. The multi-functional saddle bracket of claim 16, wherein the first extension extends in a first direction from the central portion, wherein the multi-functional saddle bracket further comprises a second extension that extends from the central portion in a section direction opposite the first direction, and wherein the second extension includes one or more additional mounting features that are each sized and positioned to hold an additional coolant line.

18. The multi-functional saddle bracket of claim 17, further comprising a second gusset extending along the second extension and configured to support the second extension.

19. The multi-functional saddle bracket of claim 16, wherein the central portion includes a fastener-free assembly that is configured to snap onto the structural member.

* * * * *